United States Patent
Osborne et al.

(10) Patent No.: US 10,802,710 B2
(45) Date of Patent: Oct. 13, 2020

(54) SYSTEM AND METHOD FOR INPUTTING ONE OR MORE INPUTS ASSOCIATED WITH A MULTI-INPUT TARGET

(71) Applicant: TOUCHTYPE LTD., London (GB)

(72) Inventors: Joseph Hayyim Benedict Osborne, Woking (GB); Yoh Okuno, London (GB)

(73) Assignee: Touchtype Ltd, London (GB)

( * ) Notice: Subject to any disclaimer, the term of this patent is extended or adjusted under 35 U.S.C. 154(b) by 127 days.

(21) Appl. No.: 15/301,910

(22) PCT Filed: Apr. 2, 2015

(86) PCT No.: PCT/GB2015/051050
§ 371 (c)(1),
(2) Date: Oct. 4, 2016

(87) PCT Pub. No.: WO2015/150832
PCT Pub. Date: Oct. 8, 2015

(65) Prior Publication Data
US 2017/0192671 A1    Jul. 6, 2017

(30) Foreign Application Priority Data
Apr. 4, 2014  (JP) ................. 2014-077801

(51) Int. Cl.
*G06F 3/048* (2013.01)
*G06F 3/0488* (2013.01)
(Continued)

(52) U.S. Cl.
CPC ........ *G06F 3/04886* (2013.01); *G06F 3/0236* (2013.01); *G06F 3/0237* (2013.01);
(Continued)

(58) Field of Classification Search
CPC .......... G06F 3/042; G06F 3/048; G06F 3/049; G06F 17/20; G06F 17/30; G06F 16/20
See application file for complete search history.

(56) References Cited

U.S. PATENT DOCUMENTS 8,170,869 B2   5/2012  Rigazio et al.
8,581,851 B2 * 11/2013  Pienimaa ................ G06F 3/018
                                                          345/168
(Continued)

FOREIGN PATENT DOCUMENTS

CN   102184024 A   9/2011
CN   102890615 A   1/2013
(Continued)

OTHER PUBLICATIONS

"Gesture Recognition for Musician Computer Interaction", thesis submitted in Mar. 2011 by Nicholas Edward Gillian, referred to as Gillian in the Office Action, retrieved from http://www.nickgillian.corn/papers/NicholasGillianThesisElectronic.pdf (Year: 2011).*
(Continued)

*Primary Examiner* — Sanchita Roy
(74) *Attorney, Agent, or Firm* — Schwegman Lundberg & Woessner, P.A.

(57) ABSTRACT

A system comprising a user interface and a prediction engine is discussed. The user interface comprises a multi-input target associated with multiple input options available for input. In a first system, the user interface is configured to select the multi-input target and input of the multiple input options. The prediction engine is configured to determine the probability that the user intended to select an input of the multiple inputs other than the selected input. In a second system, the user interface is configured to identify a first input of the multiple input options and change the identified input from the first input to a second input. The prediction engine is configured to determine the time elapsed between
(Continued)

first and second user selection events, the probability that the user intended to select the second input, and the probability that the user had intended to input the first input.

18 Claims, 7 Drawing Sheets

(51) Int. Cl.
  *G06F 3/023* (2006.01)
  *G06F 40/274* (2020.01)
  *G06F 3/0484* (2013.01)
  *G06F 3/0486* (2013.01)

(52) U.S. Cl.
  CPC ........ *G06F 3/0486* (2013.01); *G06F 3/04842* (2013.01); *G06F 40/274* (2020.01)

(56) References Cited

U.S. PATENT DOCUMENTS

| | | | |
|---|---|---|---|
| 2006/0033718 A1 | 2/2006 | Griffin | |
| 2008/0316183 A1* | 12/2008 | Westerman | G06F 3/04883 345/173 |
| 2009/0058823 A1* | 3/2009 | Kocienda | G06F 3/0236 345/173 |
| 2009/0167693 A1 | 7/2009 | Kuo et al. | |
| 2010/0036655 A1* | 2/2010 | Cecil | G06F 3/0237 704/10 |
| 2012/0223889 A1* | 9/2012 | Medlock | G06F 3/04883 345/168 |
| 2012/0254786 A1* | 10/2012 | Colley | G06F 3/04886 715/773 |
| 2014/0082545 A1 | 3/2014 | Zhai et al. | |
| 2014/0198047 A1* | 7/2014 | Unruh | G06F 3/0237 345/168 |
| 2015/0100911 A1* | 4/2015 | Yin | G06F 3/04883 715/773 |
| 2016/0357304 A1* | 12/2016 | Hatori | G06F 3/0237 |

FOREIGN PATENT DOCUMENTS

| | | |
|---|---|---|
| CN | 103201707 A | 7/2013 |
| CN | 103299550 A | 9/2013 |
| CN | 103703433 A | 4/2014 |
| JP | 2007133884 A | 5/2007 |
| JP | 2008250378 A | 10/2008 |
| JP | 2010532062 A | 9/2010 |
| JP | 2014010688 A | 1/2014 |
| WO | 2013039532 A1 | 3/2013 |
| WO | WO 2014/003138 A1 | 1/2014 |

OTHER PUBLICATIONS

International Patent Application No. PCT/GB2015/051050; Int'l Written Opinion and Search Report; dated Jun. 29, 2015; 9 pages.
"Office Action Issued In JP Patent application No. 2014077801", dated Jun. 4, 2018, 9 Pages.
"Office Action Issued In Chinese Patent Application No. 201580018626.8", dated May 9, 2018, 18 Pages.
"Office Action Issued in Japanese Patent Application No. 2014-077801", dated Oct. 2, 2018, 5 Pages.
"Office Action Issued in Chinese Patent Application No. 201580018626.8", dated Jan. 8, 2019, (w/ Concise Statement of Relevance), 14 Pages.
"Third Office Action Issued in Chinese Patent Application No. 201580018626.8", dated Aug. 2, 2019, 28 Pages.
"Office Action Issued in Japanese Patent Application No. 2019-017179", dated Feb. 17, 2020, 06 Pages.
"Office Action Issued in European Patent Application No. 15715806.4", dated Jul. 30, 2020, 8 Pages.

* cited by examiner

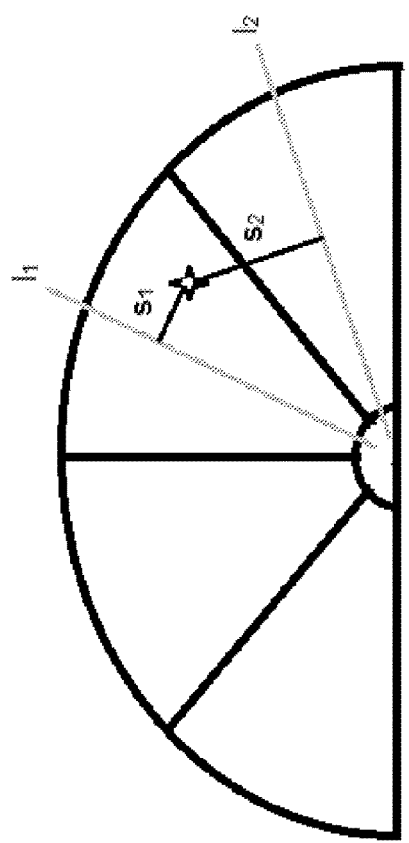
Fig. 5
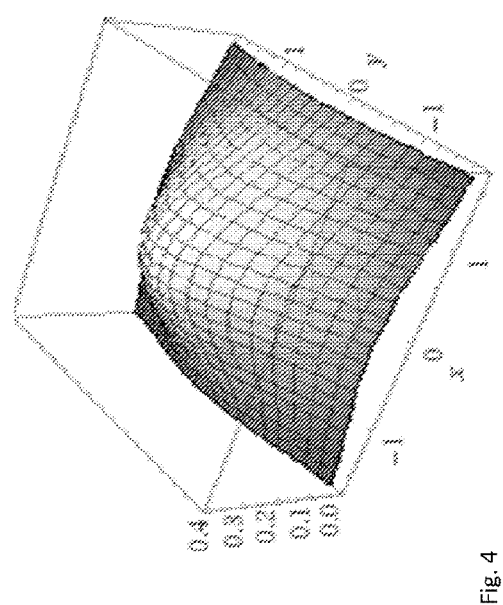
Fig. 4
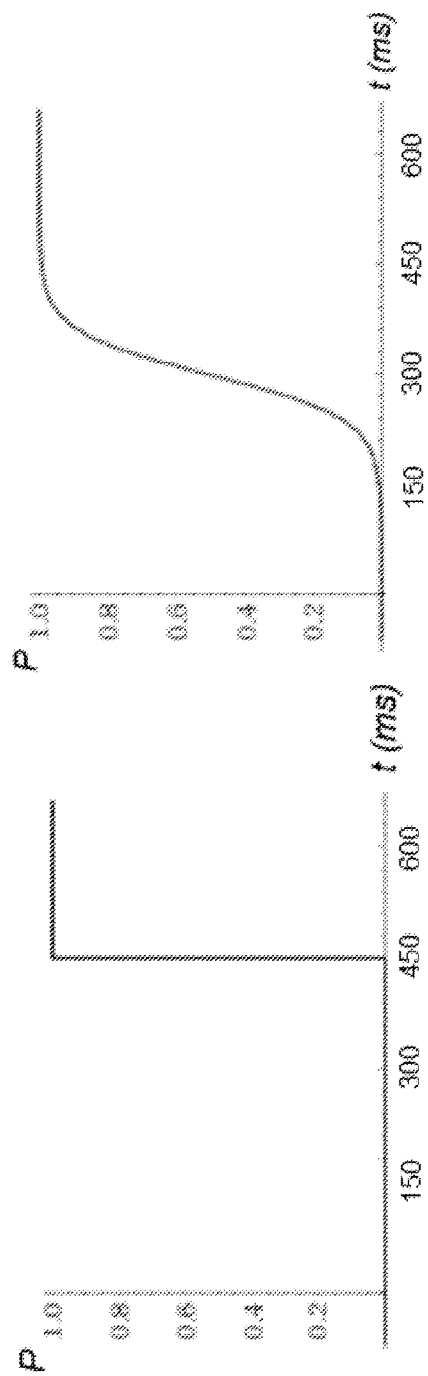
Fig. 6a
Fig. 6b

SYSTEM AND METHOD FOR INPUTTING ONE OR MORE INPUTS ASSOCIATED WITH A MULTI-INPUT TARGET

CROSS-REFERENCE TO RELATED APPLICATIONS

This is a national stage application in the United States of International Application No. PCT/GB2015/051050, filed on Apr. 2, 2015, which claims priority to Japanese Application No. 2014-077801, filed on Apr. 2, 2014, the disclosures of which are incorporated herein by reference in their entireties.

FIELD OF THE INVENTION

The present invention relates to the input of input options associated with a multi-input target of an electronic device and, in one particular embodiment, the input of one or more characters associated with a multi-character key on a keyboard.

BACKGROUND

Known user interfaces of electronic devices, such as, for example, mobile telephones or tablet computers, comprise a key representing multiple characters or multiple character variants, where the multiple characters or character variants are available for user selection to input the desired character or character variant into the device. The user is able to select the character or character variant they wish to input by performing one or more gestures on or across the key associated with the multiple characters or character variants.

An example of a known multi-input target used to input a desired character variant is shown in FIG. 1a-c. FIG. 1a shows a screenshot of a user interface comprising a QWERTY keyboard layout. In FIG. 1b, if the user holds down the 'a' key, the user is presented with a list of character variants '@, æ, â, á, à' for that key. The user is able to select the desired character variant by dragging their finger to the desired character variant, where the full circle of the figure indicates where the user's finger is on the screen. The user is able to input the selected variant by releasing their finger (a 'drag-and-lift' approach), where FIG. 1c shows the selection of the desired character variant 'á'. Instead of ending the gesture on the character key, the user interface may be configured to accept a one-dimensional indication of the desired character variant, e.g. the user can drag sideways across the screen below the row of character variants to select the desired character variant.

An example of a known multi-input target used to input a desired character is shown in FIGS. 2a-c, for inputting Japanese characters, although this known input method is suitable for any language, and is particularly suitable for languages with more than 27 characters (i.e. which do not for the QWERTY layout). This known input method is suitable for Indian languages such as Hindi, and also Chinese, Korean, or any other language in which Chinese characters or logograms are used in writing, and could also be used for the selection and input of emojis or emoticons. FIG. 2a illustrates a user interface comprising a 12 key layout for a drag-and-lift approach to inputting Japanese characters. FIG. 2b shows the character options available for selection by a user, once the user has selected the multi-character key representing those characters, e.g. by holding down the multi-character key. In FIG. 2c, the user is able to select the desired character by dragging their finger to the character they wish to input, to select that character, at which point they break contact with the touchscreen to input the selected character. A particular character may be chosen as the default character that is input if a user touches the multi-character key but does not perform a drag-and-lift action to select a character.

An alternative user interface for selecting and inputting a selected character option via a drag-and-lift gesture is shown in FIGS. 3a-c, for inputting Japanese characters (although this user interface is equally applicable to other languages). The keyboard, as shown in FIG. 3a, comprises 12 multi-character keys, and looks the same as that of FIG. 2a. Once a multi-character key of the keyboard is selected, by holding down on the key, the user is presented with the character options associated with that multi-character key (as shown in FIG. 3b). By dragging to select the desired character key and breaking contact ('lift') with the screen once that character key has been selected, it is possible to input that character. FIG. 3c shows the selection of a character by performing a drag to the right, to select the right hand key, and breaking contact with the screen upon selection of that key. As can be seen from FIG. 3c, dragging to select the character does not mean that the user's finger has to end on the displayed character key, but that the direction and length of the drag is sufficient to select that character key.

Electronic systems comprising the above-described user interfaces provide a means for allowing a user to input a selected character or character variant from a plurality of characters or character variants that are available for user selection via a multi-character key. However, in the above described systems, the selected input is deterministic, in that if the user has selected an input option, it is that input option that is input, regardless of whether they actually intended to input that selected option, e.g. the user may have dragged in the wrong direction or may have lifted their finger too soon in the drag-and-lift gesture.

The accuracy at which users can select options for input into a device is dependent on numerous factors, for example one or more of the following factors may affect the accuracy of a user's selection from multiple options: the time they take to select the desired input option, whether they are distracted whilst they are making the selection (e.g. because they are walking or talking whilst selecting the option), the user interface layout of the input options, the gesture required to select an option, accessibility (e.g. hand stability, finger length), the device used (e.g. physical screen size), the user's habit (e.g. always touching above key centres), etc.

In current systems there is no error correction based on the user selection of an input option from multiple input options, i.e. the user selection event is not modelled to take into account user error. This lack of error modelling with respect to the selection event can lead to less accurate input which can lead to a frustrating user experience.

A wrongly inputted character may be corrected via language modelling. For example, if the user has input a sequence of characters that has not been seen before, the sequence of characters can be corrected to a sequence known to a language model or dictionary of known terms. However, the correction of the character is based on language modelling and not based on the user's selection event. By first, or alternatively, correcting at the user selection event, the text predictions may be made more accurate, because a greater number of inputs can be considered by the system. By correcting a user selection event, it is also possible to provide more accurate or alternative predictions of user intended input, where that input is not modelled by language modelling, for example, when inputting emojis or emoticons.

Another known way of selecting a character input from a multi-character key, is the multi-tap approach. Each key represents a number of characters, as shown by the 12 multi-character keys of FIG. 2a and FIG. 3a. To enter a desired character, the user cycles through the available character options by tapping the key the desired number of times. If the user's taps are in quick succession, the user is able to cycle through the characters to select the desired one. To enter that selected character and move on to inputting the next character, the user must wait until a predetermined time period (from selecting the desired character for input) has elapsed. FIG. 6a illustrates the probability function, P(t), for this multi-tap approach, where, for example, the predetermined time period has been set at 450 ms. As can be seen by FIG. 6a, the probability function, P(t), is a step function, where the probability function represents the probability that the user intends to enter a new character (rather than change the existing one). If the predetermined time period between two particular taps has not been exceeded, then the selected character is switched. However, if the predetermined time period has elapsed since the last keypress, the character corresponding to the last keypress is entered and a new character entry sequence is commenced. Thus the elapsed time is deterministic in distinguishing input options from one another. For example, if the user taps the あ key, the user selects for input among あ, い, う, え, お, as the of tapping continues. If the user wants to input two characters, both of which are input from the same key, e.g. "ああ", the user has to wait for the time from typing the first character "あ" to elapse past the predetermined threshold before typing the second character, "あ". The multi-tap approach for selecting characters is suitable for any language, and is currently employed for text input on mobile phones across the world.

Advanced users of such a multi-tap system are forced to wait even though they can tap more quickly, while beginners may have difficulty inputting characters as they cannot tap quickly enough to change the character rather than inputting a new character. This can lead to a frustrating and slow means for inputting text.

It is an object of the present invention to address one or more of the above mentioned problems.

SUMMARY OF THE INVENTION

In a first aspect of the present invention, there is provided a system comprising a user interface comprising a multi-input target associated with multiple input options available for input by user selection. The user interface is configured to: select the multi-input target upon receipt of a first user selection event; and select an input of the multiple input options upon receipt of a second user selection event, wherein the second user selection event is spatially separated from the first user selection event. The system further comprises a prediction engine, wherein the prediction engine is configured to determine, based on the second user selection event, the probability that the user had intended to select an input of the multiple inputs other than the selected input.

Preferably, the prediction engine is configured to determine, based on the first user selection event and the second user selection event, the probability that the user had intended to select an input of the multiple inputs other than the selected input.

Preferably, the prediction engine is configured to determine the probability using the location of the first user selection event and the location of the second user selection event.

In a preferred embodiment, the first user selection event corresponds to a first tap or the start of a drag- and lift gesture and the second user selection event corresponds to a second tap or the lift of the drag-and-lift gesture. The prediction engine may be configured to determine the distance and direction between the locations of the first and second user selection events.

The prediction engine preferably comprises a 4D probability distribution model for each input of the multiple inputs. The prediction engine can determine the probability that the user had intended to select an input of the multiple inputs by querying the model associated with that input with the first and second locations or with the first location, and the distance and direction between the first and second locations. The model may be a 4D Gaussian.

In one embodiment, the first user selection event corresponds to the start of a flick gesture and the second user selection event corresponds to the end of the flick gesture. The prediction engine is configured to determine the flick direction from the start and end locations; and determine the probability that the user intended to select the input of the multiple inputs based on the start location and the direction of the flick.

The prediction engine may be configured to generate the probability that a user intended to select a given input option for each of the multiple input options.

The user interface may comprise a plurality of multi-input targets and the prediction engine may be configured to determine, based on the first selection event, the probability that the user had intended to select the selected multi-input target.

In response to the first user selection event, the user interface may be configured to display the multiple input options separated in space.

The prediction engine preferably comprises a plurality of models, one for each input option of the multiple inputs, wherein each model relates previous first and second user selection events corresponding to an input of the multiple inputs to that input, wherein the prediction engine is configured to generate, in association with the plurality of models, the probability that the first and second user selection events relates to a particular input of the plurality of inputs.

The multi-input target may be a multi-character key on a virtual keyboard that represents multiple character input options.

In a second aspect of the present invention, there is provided a system comprising a user interface comprising a multi-input target associated with multiple input options available for input by user selection. The user interface is configured to identify a first input of the multiple input options upon receipt of a first user selection event directed at the multi-input target; and change the identified input from the first input to a second input of the multiple input options upon receipt of a second user selection event directed at the multi-input target. The system comprises a prediction engine, wherein the prediction engine is configured to: determine the time elapsed between the first and second user selection events; determine that the time elapsed is less than a predetermined threshold; and determine, based on the elapsed time, the probability that the user had intended to select the second input and the probability that the user had intended to input the first input and then select the first input again. The predetermined threshold is set such that if the elapsed time is greater than the predetermined threshold, the first input is input into the system with a probability of 1, and the first input is selected again.

The multi-input target is preferably a multi-character key on a virtual keyboard that represents multiple character input options.

The first user selection event preferably corresponds to a first tap on the multi-character target which selects the first input and the second user input event corresponds to a second tap on the multi-character target which changes the selected input to the second input.

The probability between the first user selection event and the predetermined threshold may be modelled by a sigmoid function. The sigmoid function could take the form $$P = \frac{1}{1 + \exp(-(t - t_{p=0.5}))}$$

wherein P is the estimated probability that the user had intended to input the second input, t is the time elapsed between the first and second user selection events, and $t_{p=0.5}$ is the elapsed time at which the probability is equal to 0.5 in the modelled sigmoid probability distribution.

In a third aspect of the present invention there is provided a method of determining, using a prediction engine, the probability that a user intended to select an input of a user interface that displays multiple input options available via a multi-input key. The method comprises receiving by the user interface a first user selection event to select the multi-input target; receiving by the user interface a second user selection event to select an input of the multiple input options displayed, wherein the second user selection event is spatially separated from the first user selection event; and determining based on the second user selection event, the probability that the user had intended to select an input of the multiple inputs other than the selected input probability.

The probability is preferably determined based on the first user selection event and the second user selection event. The probability is preferably determined using the location of the first user selection event and the location of the second user selection event.

Preferably, the first user selection event corresponds to a first tap or the start of a drag- and lift gesture and the second user selection event corresponds to a second tap or the lift of the drag-and-lift gesture.

The method may comprise determining the distance and direction between the locations of the first and second user selection events.

The prediction engine preferably comprises a 4D probability distribution model for each input of the multiple inputs. Determining the probability that the user had intended to select an input of the multiple inputs may comprise querying the model associated with that input with the first and second locations or with the first location, and the distance and direction between the first and second locations. The model may be a 4D Gaussian.

The first user selection event may correspond to the start of a flick gesture and the second user selection event corresponds to the end of the flick gesture. In such a case, the method comprises determining using the prediction engine the direction of the flick; and determining the probability that the user intended to select the input of the multiple inputs using the start location and the direction of the flick.

The method may comprise determining the probability that a user intended to select a given input option for each of the multiple input options.

The user interface may comprise a plurality of multi-input targets and the determination, using a prediction engine, may further comprise determining, based on the first selection event, the probability that the user had intended to select the selected multi-input target.

The prediction engine may comprise a plurality of models, one for each input option of the multiple inputs, wherein each model relates previous first and second user selection events corresponding to an input of the multiple inputs to that input, wherein the prediction engine is configured to generate, in association with the plurality of models, the probability that the first and second user selection events relates to a particular input of the plurality of inputs.

In a fourth aspect of the present invention, there is provided a method of determining, using a prediction engine, the probability that a user intended to select one of two input options based on a first user selection event and a second user selection on a user interface, wherein the user interface comprises a multi-input target associated with multiple input options available for input by user selection. The method comprises receiving by the user interface a first user selection event directed at the multi-input target to identify a first input of the multiple input options; and receiving by a second user interface a second user selection event at the multi-input target to change the identified input from the first input to a second input of the multiple input options. The method further comprises determining using the prediction engine the time elapsed between the first and second user selection events; determining using the prediction engine that the time elapsed is less than a predetermined threshold; and determining, based on the elapsed time, the probability that the user had intended to select the second input and the probability that the user had intended to input the first input and then select the first input again. The predetermined threshold is set such that if the elapsed time is greater than the predetermined threshold, the first input is input into the system with a probability of 1, and the first input is selected again.

The multi-input target may be a multi-character key on a virtual keyboard that represents multiple character input options.

The first user selection event may correspond to a first tap on the multi-character target which selects the first input and the second user input event corresponds to a second tap on the multi-character target which changes the selected input to the second input.

The probability between the first user selection event and the predetermined threshold may be modelled by the prediction engine as a sigmoid function. The sigmoid function may take the form $$P = \frac{1}{1 + \exp(-(t - t_{p=0.5}))}$$

wherein P is the estimated probability that the user had intended to input the second input, t is the time elapsed between the first and second user selection events, and $t_{p=0.5}$ is the elapsed time at which the probability is equal to 0.5 in the modelled sigmoid probability distribution.

In a fifth aspect of the present invention, there is provided a computer program product comprising a computer readable medium having stored thereon computer program means for causing a processor to carry out any of the above methods.

BRIEF DESCRIPTION OF THE DRAWINGS

The present invention will now be described in detail with reference to the accompanying drawings, in which:

FIG. 4 illustrates a Gaussian distribution which can be used to model a point distribution, for example a touch gesture on a key;

FIG. 5 is an example panel display for selecting character options, illustrating the way in which probabilities may be determined;

FIG. 6a illustrates a step probability function for determining whether a character is to be changed or a new character is to be entered in a known multi-tap approach;

FIG. 6b illustrates a probability function in accordance with the present invention for determining the probability that a user intended to change an existing character or enter a new character in a multi-tap approach in accordance with the invention;

DETAILED DESCRIPTION OF THE INVENTION

Figure 1C:
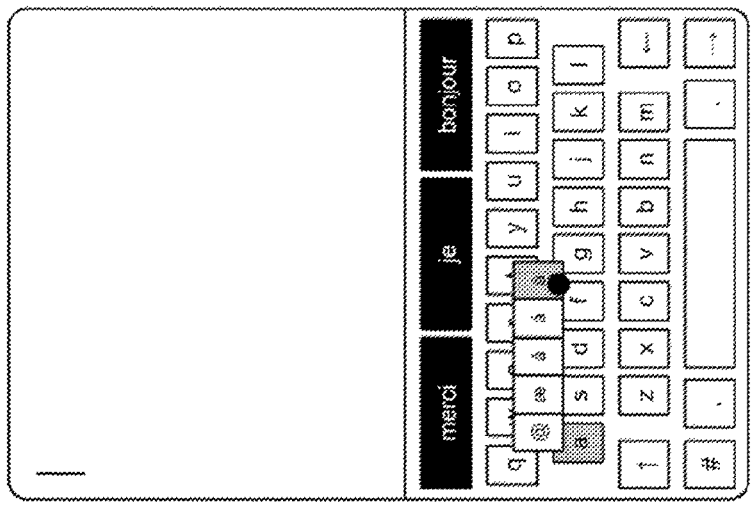
FIGS. 1a-c illustrate a known user interface for inputting a character variant, where the user inputs a character variant by selecting a character on a QWERTY keyboard to bring up the character variants for that character, and applying a drag-and-lift gesture to select the desired character variant.

The present invention provides a system and method for modelling error in a user selection event used to select an input from multiple input options. In particular, the systems and methods predict the likelihood that the user had intended to select an input option other than that selected by the selection event, to enable the input options other than that selected by the user selection event to be input into the system.

In general a system in accordance with the present invention comprises a user interface and a prediction engine. The user interface can be any suitable means for allowing a user to interact with the system to select a desired input option from multiple input options associated with a multi-input target, and input that desired input into the system. For example, the user interface may comprise a mouse to enable a user to select items from a display or the user interface may comprise a means to track eye/hand/arm movement to allow a user to select objects displayed by the system using eye/hand/arm motion. In a preferred embodiment of the present system, the user interface comprises a display and processing circuitry configured to display on the display targets and input options for user selection via user selection events. In accordance with exemplary embodiments, the system is one of a mobile telephone, tablet or computer and the user interface is a touchscreen display, which displays objects for user selection and receives user input selection events via the touch-sensitive display.

A user selection event is any event by which the user selects an object of the user interface, and includes user selection of a multi-input target from a plurality of multi-input targets displayed, and the user selection of an input option from multiple input options. A selection event may be performed in any suitable way. In the preferred embodiment, a selection event corresponds to a gesture on or across a touchscreen. The gestures may comprise one or more of the following performed by a finger or suitable pointing object: a click or tap, a stroke or drag across the touchscreen, and a flick. The 'first user selection event' and 'second user selection event' may be parts of the same gesture. By way of non-limiting example, the start of a flick movement may correspond to the first user selection event, as this start location selects the multi-input target, and the end of the flick (i.e. the point at which the user breaks contact with the screen) may correspond to the second user selection event, because the direction of the flick can then be determined to select an input option. For the drag-and-lift gesture, the first user selection event may be the start location of the drag and the second user selection event may be the location at which the user breaks contact with the screen. Thus, the first user selection event and the second user selection event are intended to encompass parts of the same gesture, as well as separate gestures (for example two or more taps separated in space).

The multi-input targets associated with multiple input options for user selection may correspond to any suitable input the user may want to enter. In the preferred embodiment, the multi-input target is a multi-character target which display multiple character options available for user selection and input into the device. The term 'character' is intended to cover any letter, numerical digits, common punctuation marks (such as "." or "-"), whitespace, and symbol used in written language, e.g. any symbol used in Chinese, Japanese, Korean, Indian, or any other language. In the context of the present invention, 'character' also covers character variants, e.g. à.

However, other embodiments of the system of the present invention may comprise a multi-image target representing multiple images, e.g. a food emoji key that allows the user to select the relevant food emoji, or an emoticon or face emoji key that allows the user to select the emoticon/emoji that reflects the emotion the user wishes to convey, etc. It is thus envisaged that the user may wish to enter data other than text via the multi-input targets.

The input options available for input from a multiple-input target are preferably displayed in a display pattern when the target is selected. In one embodiment, the display comprises a set of keys corresponding to the input option, for user selection of the key corresponding to their desired input option. However, in an alternative embodiment (e.g. the multi-tap approach), the multi-input target can display the options available on the target, without displaying the options in a display pattern when pressed.

As will be understood from the above description, in the preferred embodiment of the present invention, the multi-input target is a multi-character key on a virtual keyboard of a touchscreen.

The prediction engine is any means that is capable of generating a probability estimate on the basis of a user selection event, for example, based on one or more of the location of the gesture on a virtual keyboard, the shape of the gesture, the length of the gesture, the amount of time for which the gesture is performed, the time that has elapsed between selection events, a comparison between the current selection event and previous selections events for that user and that input option, etc. In one embodiment of the invention, the prediction engine comprises a plurality of models to model the available input options.

By way of non-limiting examples, specific error correction implementations of the present invention are described for the known input approaches described in the background, with a number of alternative implementations discussed. However, the systems and methods of the present invention are not limited to these examples, and can be applied to any type of user selection of an input option from a multi-input target that requires two user selection events.

Drag-and-Lift Gesture

Figure 2C:
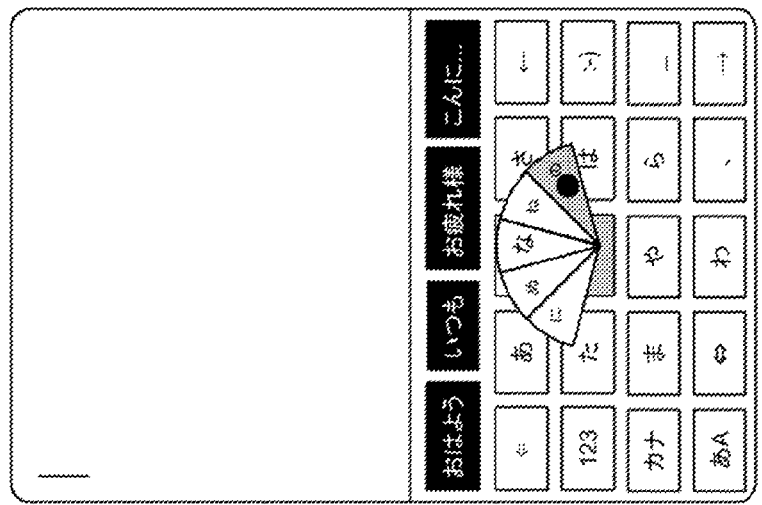
FIGS. 2a-c illustrate a known user interface comprising 12 multi-character keys, where the user is able to input a particular character by selecting a key to bring up the character options for that key, and applying a drag-and-lift gesture to select the desired character.
Figure 2B:
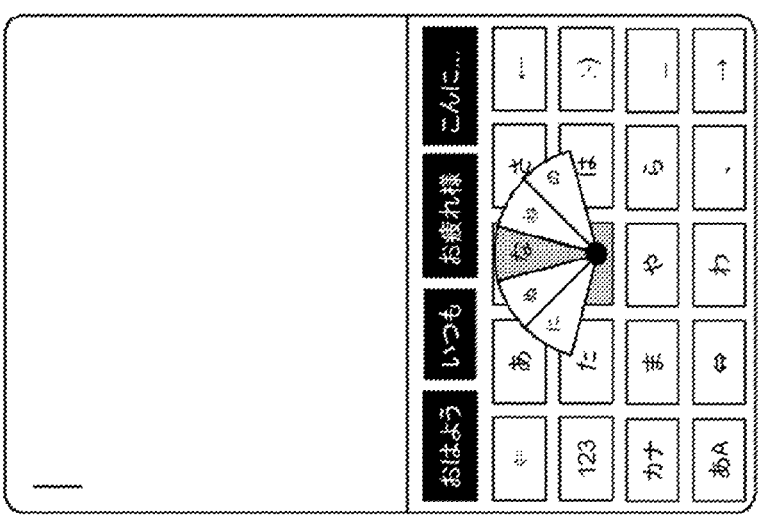
Figure 2A:
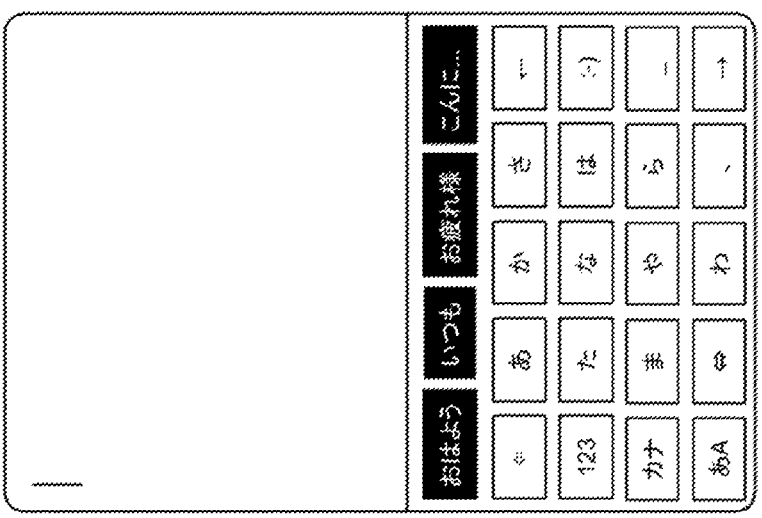
Figure 3C:
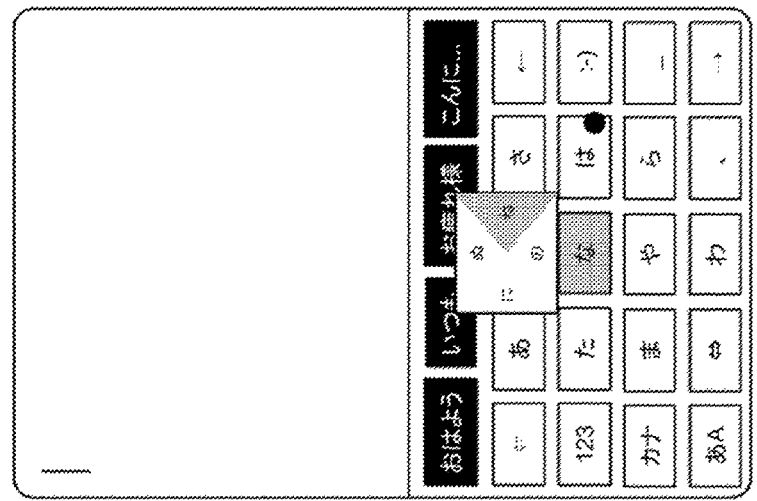
FIGS. 3a-c illustrate a known user interface comprising 12 multi-character keys, where the user is able to input a particular character by selecting a key to bring up the character options for that key, and applying a drag-and-lift gesture to select the desired character.
Figure 3B:
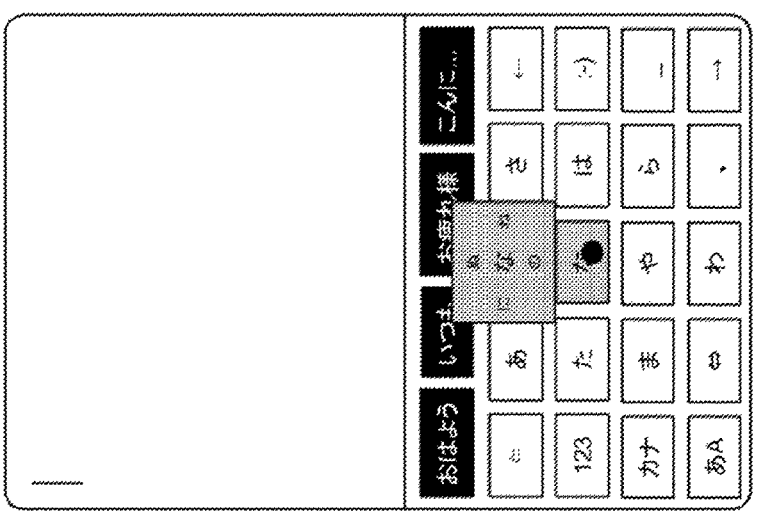
Figure 3A:
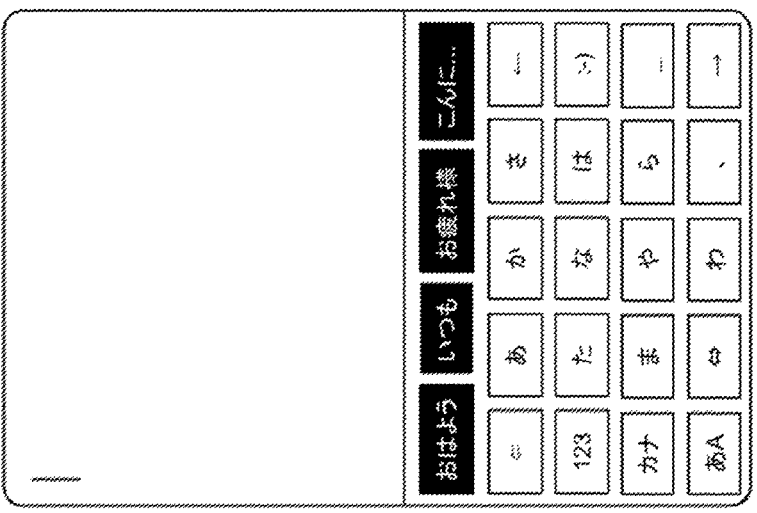

As described in the background section, in response to a first user selection event, corresponding to a press (or press and hold) of a multi-character key, the user interface displays the character options available for user selection via a set of character keys (an example of which is shown in FIGS. 2b and 3b). The user is able to select one of the character options displayed, by dragging their finger across the screen to select the required character key (as shown in FIGS. 2c and 3c). When the desired key is selected on the user interface (which may be indicated by the key being highlighted), as is shown in FIGS. 2c and 3c, the user can lift their finger to break contact with the screen and input the character of that selected key.

In the system of the present invention, the prediction engine is configured to model the drag-and-lift gesture to determine the probability that a user intended to select a given character option via that gesture. The prediction engine is configured to determine the probability for a plurality of the input options, e.g. the prediction engine is configured to determine the probability that a user intended to select an input option, where that input option is not the one that was selected on the user interface by the user's gesture. Thus, the user selection event is not deterministic, and error in the selection event is modelled.

In a preferred embodiment of the present invention, the prediction engine is configured to model the drag-and-lift gesture as a four-dimensional distribution. The prediction engine takes two sets of coordinates from the drag-and-lift gesture as input for the modelling: 1) the starting point ($x_1$, $y_1$), where the user first touched to select the multi-character key; and 2) the end point ($x_2$, $y_2$) where the user lifts their finger to break contact with the screen.

In one embodiment, the prediction engine determines the relative coordinate ($x_2-x_1$, $y_2-y_1$), to determine the distance d and direction $\ominus$ (defined relative to a given axis) of the drag-and-lift gesture. However, the two sets of coordinates could also be used for the modelling since they encode the direction and distance information. The distance and direction of the drag is determined from a straight line between the start and end points of the drag-and-lift gesture. For more complicated paths, the same approach can be followed, where the start and end locations of the gesture are taken as input, with the intermediate path being ignored.

The prediction engine comprises a model 4D probability density distribution for each character option of a given multi-character key. In one embodiment, the character options are displayed in the same display pattern for each multi-character key, and the prediction engine stores as many models as there are character options for a multi-character key. However, since some multi-character keys may be more awkward to press than others (dependent on hand position on the device, etc.), the drag-and-lift gesture to a character key of a multi-character key, may have a different pattern to a drag-and-lift gesture to a corresponding character key on a different multi-character key, even though the multi-character keys display the same pattern of character keys. The prediction engine may therefore comprise a plurality of models corresponding to one model for each character key of each multi-character key.

In a preferred embodiment, the 4D probability density distribution is modelled as a multivariate Gaussian distribution, but other 4D distributions can be used, for example a Laplace or Gamma distribution, or von Mises distribution which is equivalent to a Gaussian distribution transformed to a circular variable.

For each drag-and-lift input, the probability generator queries each Gaussian corresponding to each character option of the relevant multi-character key (with the drag-and-lift parameters $x_1$, $y_1$, d, $\ominus$) to return the Gaussian probability density function, evaluated at the parameters $x_1$, $y_1$, d, $\ominus$, thereby providing a probability estimate for whether the user intended to select that character via the gesture.

The probability generator is therefore able to determine a probability estimate for each character option of the multi-character key. However, suitable pruning can be applied, for example taking the N characters with the highest probabilities for each drag-and-lift input.

In an alternative, simplified embodiment, the prediction engine is configured to generate predictions for the intended character input based on the location at which the user broke contact with the touchscreen, i.e. generate predictions based on the second selection event only, ignoring the distance and direction of the drag gesture. For example, the prediction engine can be configured to determine the probability that the user intended to select a particular character key using a 2D Gaussian to model a point distribution (see FIG. 4), taking the coordinates of the location at which the break in contact occurred as input; or by comparing the distance between the location at which the break in contact occurred to the centre of the character key or to a line running through the key, etc. FIG. 5 illustrates how the prediction engine may determine the probability based on the distance from the break contact (denoted by a star) to a line running through the centre of the key (where the distances $S_1$, $S_2$ are distances in a direction perpendicular to the central lines $S_1$, $S_2$). In these simplified models, the start point and end point of the drag-and-lift gesture are considered independent.

The simplified models require less computation, but are less accurate. By taking into account distance and direction, the prediction engine is able to provide more accurate predictions of the user's intended input.

Figure 1B:
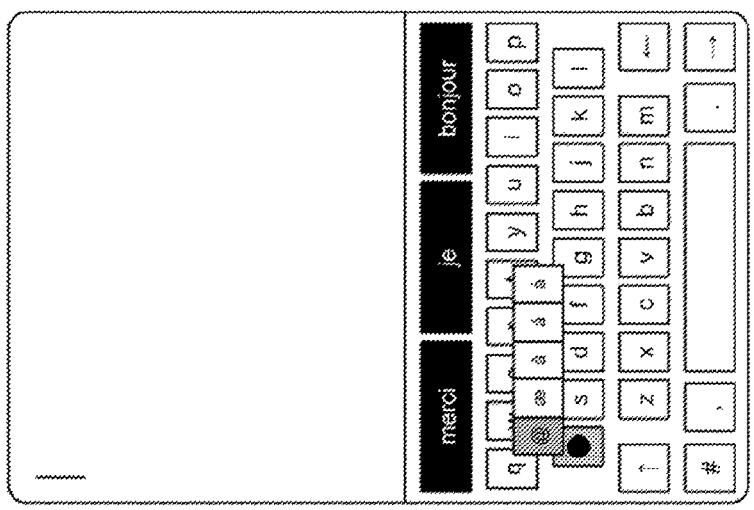
Figure 1A:
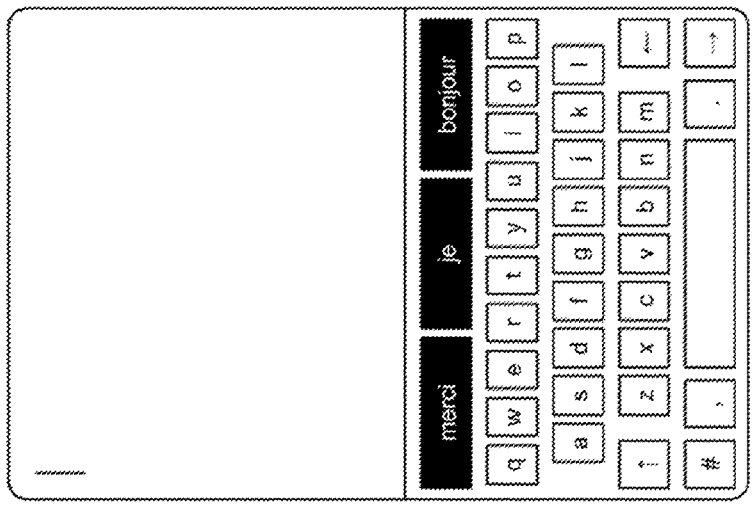

In an alternative embodiment, based on a one dimensional selection of an input option, for example the selection of a character from a single line of characters (where the distance between the first selection event and the second selection event along the line of characters, is the only distance of interest, e.g. as described for the character variants with reference to FIGS. 1a-c), the prediction engine may be configured to model the drag-and-lift gesture as a 2D Gaussian, taking the start $x_1$ and end $x_2$ locations as input, or the start location $x_1$ and the distance d between the locations $x_1$, $x_2$, to determine the probabilities that the user intended to enter the character options. In line with the simpler model described above, the prediction engine may consider only the break point location and determine the probabilities based on the different distances between the break point location and the centres of the keys.

Multi-Tap (Spatially Separated)

In response to a first user selection event, corresponding to a tap on a multi-character key, the user interface displays the options available for selection via a set of character keys (an example of which is shown in FIG. 2b). The user is able to select one of the character options displayed, by tapping the desired character key (without tracing a path between tap locations).

The same approach as the drag-and-lift approach can be applied to a multi-tap approach, where the locations of the first and second taps can be considered in the same way as the locations of the start of the drag and the break in contact with the touchscreen at the end of the drag. Thus, the prediction engine can model the double tap input as a 4D distribution, taking the first tap location $(x_1, y_1)$ and the second tap location $(x_2, y_2)$ as input (or taking d, e as input) to determine the probabilities.

Furthermore, as also specified above, a simplified model can be used by the prediction engine to model the second tap location independent of the first tap location, e.g. using a 2D Gaussian for modelling a point distribution and taking the 2D location of the second tap as input, or by comparing the distances between the location of the second tap to the centres of the character keys or to lines running through the keys, etc.

The one dimensional selection of an input option can also apply to the double tap approach, where the location of the first and second taps are taken as input for a 2D Gaussian or the simpler approach where the probabilities are based on the distances between the second tap location and the centres of the character keys.

Flick Gesture

In addition to the drag-and-lift gesture or double tap to select a character from a multi-character key, as described above, the user interface may be configured to accept a flick gesture to select an input option. In the context of this application, a flick gesture is a gesture which consists of a starting point and a directional movement. The user is not constrained to extend the flick to the desired input character to select that character; the direction of the movement being sufficient to indicate the desired character.

As described above, in response to a first user selection event, corresponding to a press (or press and hold) of a multi-character key, the known user interface displays the character options available for user selection via a set of character keys (an example of which is shown in FIG. 3b). Although described in terms of an initial touch of a multi-character key to display the character input options, this design of user interface is not necessary, e.g. the multi-character key may display the character options available, with the direction for their selection indicated on the multi-character key.

By flicking in the direction of the character they wish to enter, the user is able to input their desired character.

The probability that the user intended to select a particular character via the flick gesture can be modelled based on the start point of the flick and the direction of the flick compared to the known directions to the character keys. Thus, each character key of the multiple character options can be modelled as a 3D distribution with the variables x, y and $\ominus$, where the coordinates x, y represent the touch location for the start of a flick gesture (i.e. the 'first user selection event') and $\ominus$ represents the angle of the flick from this touch location to the key (defined relative to a given axis).

The direction of flick is determined by taking a second location ('second user selection event') of the flick, spaced from the start location, where that second location is preferably the end of the flick, at which the user breaks contact with the screen.

The prediction engine takes the parameters x, y, $\ominus$ and determines (by querying the 3D probability density distribution with the parameters) for each key the probability that the user intended to select that key via the flick gesture.

In a preferred embodiment, the 3D distribution is a multivariate Gaussian. However, any suitable 3D distribution could be used, including a von Mises distribution which is equivalent to Gaussian distribution transformed to a circular variable.

This is a simple model (relative to the 4D model of the drag-and-lift gesture) that does not take into account the distance of the flick. However, this simple model may be sufficient for many user interfaces, for example a user interface which does not have ambiguity of character with angle, i.e. a user interface which does not have multiple characters spaced apart from one another in distance, but along the same angular direction.

The advantage of this approach is simplified computation over an approach that considers distance as well as direction. However, the approach is generally less accurate.

For example, referring to FIG. 5, the further radially that the user moves from the centre start location, the more easily two input options are distinguished, because the distances to the centres of the keys is increased. Therefore by looking at the distance of the gesture as well as the start location and angle, the prediction engine is able to more accurately predict the user's intended input option.

Modelling the Selection of the Multi-Input Target as Well as the Selection of an Input Option from that Multi-Input Target As described above, the prediction engine is configured to model the selection of an input option from multiple input options, to determine the probability that the user intended to select a particular input option from multiple input options, one of which was actually selected by the user.

The prediction engine of the present invention can be configured to provide correction modelling to the selection of the multi-character key, as well as to the selection of a character from the multi-character key. Thus, the prediction engine is configured to predict the probability that a user had intended to input a character from a multi-character key other than the multi-character key that was actually selected. Each multi-character key can be modelled by a 2D Gaussian (or any 2D distribution) centred on the key. The touch location corresponding to the selection of a particular multi-character key can be taken as input to return the probability (via querying the Gaussian model) that the user intended to select that key. Alternatively, the distances from the touch location of the selection event to the centres of the multi-input targets can be determined to provide associated probability values. The touch location of the selection event can correspond to the first tap of the double tap approach, the start of the drag-and-lift gesture, or the start of the flick gesture.

In such an embodiment, the prediction engine is configured to determine the probability that the user intended to select a character of a multi-character key as P(character key|Target key)*P(Target key), where P(character key|Target key) is the probability that the user intended to select a particular character key given a particular target key (e.g. determined by a 4D Gaussian approach) and P(Target Key) is the probability that the target key selected was the one intended, which can be determine by the 2D Gaussian modelling.

The prediction engine is therefore able to determine the probability that a user intended to select a particular character key via the gesture, and determine what character that key corresponds to for other multi-character key options.

Modelling Previous User Input

In addition to the above, the prediction engine may be configured to model the error in the selection events based on the user's historical interaction with the multi-target keys and character keys of the keyboard, i.e. modelling how the user selects particular character keys given a certain display of character keys and/or modelling how the user selects a multi-character key.

WO 2012/156686 titled "USER INPUT PREDICTION" describes a system that adapts to a user and learns the style in which a user inputs text. By modelling the user's historical interaction with the system, the system of WO 2012/156686 is able to more accurately predict which character the user intended to input given an input event. The same historical interaction modelling can be applied to the systems and methods for modelling error in the user's selection of an input option from a multi-input target, as described above. In particular, the same historical interaction modelling can be used to determine the probability that the user intended to select the selected multi-input target and/or selected input option, where those probabilities are based on touch locations related to one or more user selection events. To that end, WO 2012/156686 titled "USER INPUT PREDICTION", published on 22 Nov. 2012, is hereby incorporated by reference in its entirety.

On lines 11-19 of page 14, WO 2012/156686 provides an example of the system in which given an input event, the input probability generator generates a probability p(xκ, M) for each target c, that the user had intended to select that target by the input event. To generate the probability value for a given target, the input probability generator queries the model for that target to return the current MAP estimate of the model parameters, $\mu_c$, $\Sigma_c$. The input probability generator then uses the model parameters to calculate the value of the Gaussian probability density function, $G(x; \mu, \Sigma)$, evaluated at the input location x.

In the context of the present invention, the 'input event' can correspond to the two locations representing the start and lift of a drag-and-lift gesture or the two taps of a double tap approach for the user selection of a character from a multi-character key. The model M is a 4D Gaussian, as explained above, and the parameters x used to query that model are $x_1$, $y_1$, d, $\ominus$. Thus, rather than using a 4D Gaussian function with fixed parameters for each character key of the multi-character targets, the prediction engine uses a 4D Gaussian with parameters that vary with user selection of that key.

Similarly, the prediction engine can be configured to model previous user selection of a key by a flick gesture, such that the prediction engine provides probability estimates that take into account a user's flick style for a given key. This may be useful where a particular flick direction is awkward to a user, and results in flicks that are consistently focussed in a direction other than that of the general model for that key.

In a simplified approach where the touch/lift location for the first and second user selection events are treated independently, the approach discussed in WO 2012/156686 can apply directly to the selection of the multi-character keys by the first user input event and the selection of the character option via the second user selection event (where the selection events are modelled independently as a point locations).

WO 2012/156686 (lines 4-22 of page 15) describes how a character selected via a text prediction can be mapped back to the user input event, to know which user input events correspond to which characters (to update the corresponding character models). The same mapping approach can be applied here, e.g. to map the parameters of a given drag-and-lift gesture to the key corresponding to the character the user intended to input.

Combination of Gestures

In addition to the above embodiments, the user interface may be configured to receive as a selection event a drag- and lift gesture, as well as a flick gesture and/or a tap gesture.

In such an embodiment, the prediction engine may be configured to determine the probability that the user selection event corresponds to a particular gesture, in order to determine the probability that the user intended to input a particular character on the basis of the gesture.

Figures 7A, 7B:
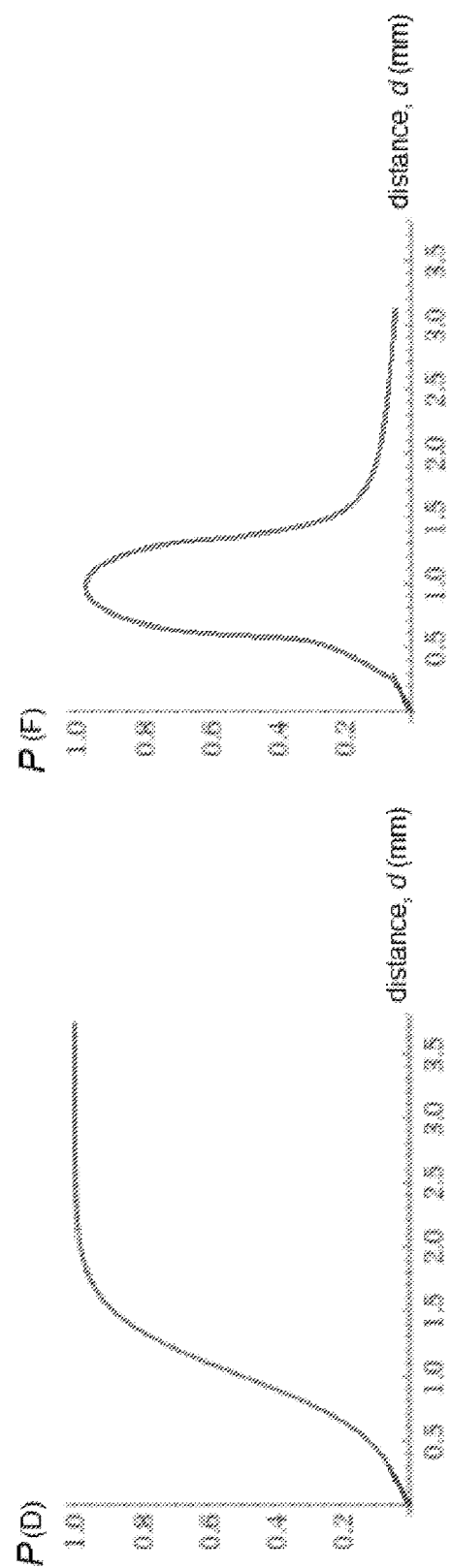
FIG. 7a is a probability distribution for a drag-and-lift gesture, illustrating the probability of a drag-and-lift gesture versus distance between start and lift locations.
FIG. 7b is a probability distribution for a flick gesture, illustrating probability of a flick gesture versus distance between start and lift locations of the flick.

The probability of a drag-and-lift gesture event given a distance x, between the initial start location for the gesture and the location at which contact is broken, can be modelled by the probability function shown in FIG. 7a. FIG. 7b provides an example probability function for a flick gesture. Based on whether the gesture is a flick or a drag-and-lift gesture, the prediction engine uses the 3D or 4D Gaussian respectively.

This method could be used to determine whether a user intended to tap a multi-input key to insert a default input for that key or to drag-and-lift or flick to select a particular input of the key, since the probability of a flick or drag-and-lift gesture will be very low for negligible distances×from the start location. As can be seen by FIGS. 7a and 7b, a short gesture may be determined to be a flick gesture, with a longer gestured determined to be drag-and-lift gesture, since generally a flick gesture is a shorter gesture than a drag-and-lift gesture to select a character.

Multi-Tap (to Cycle Through Characters)

As described in the background section above, to enter a desired character in the multi-tap approach, the user cycles through the available character options by tapping the key the desired number of times. If the user's taps are in quick succession, the user is able to cycle through the characters to select the desired one. As explained previously with reference to FIG. 5a, in the known multi-tap approach the elapsed time between taps on the same key is deterministic in distinguishing input options from one another (i.e. whether to change the selected character to the next character in the cycle or whether to input the selected character and start a new character input).

In the multi-tap (character cycling) aspect of the present invention, the elapsed time between keystrokes is used to provide a probability estimate for determining whether the user, via the latest keystroke, intended to enter a new character or change the selected current character.

In a preferred embodiment of the present invention, the prediction engine is configured to model the probability function, P(t), between a first tap (i.e. 'a first user selection event') and the expiration of a predetermined time period as a sigmoid function. The system of the present invention therefore provides ambiguity prior to the expired time period (rather than implementing a deterministic approach) to determine the probability that the user intended to start a new character or amend the current selected character by cycling through the character options.

An example of a suitable probability function is $$P(t) = \frac{1}{1 + \exp(-(t - t_{p=0.5}))}$$

Where t is the time since the first key press and $t_{p=0.5}$ is the time at which the probability function has a value of 0.5, i.e. where there is an equal probability that the user intended to cycle through the character selection and intended to start a new character cycle from the same key. For the example shown in FIG. 6b, where the predetermined threshold for elapsed time is 450 seconds, $t_{P=0.5}$=300 ms.

Thus, $t_P$ is the threshold time beyond which the prediction engine determines that a second tap (i.e. a second user selection event) is intended to start a new character cycle rather than amend a character of an existing character cycle. The prediction engine may be configured to biases $t_P$ towards or away from the threshold for elapsed time, at which the probability is 1 for inputting the previous character and starting a new character sequence. This is because users have different speeds at which they can enter successive taps. The threshold elapsed time may be changed manually by the user or may be preset. The prediction engine may be configured to retain and optionally update $t_p$ values for each multi-character key. For example, the user may find one multi-character key to be in a position that is more awkward than another, meaning that the taps of that key are more widely spaced in time than those of a more accessible key.

Thus, for two taps which are not temporally separated by a period equal or greater than the predetermined expiration period, there will be two possible input options. For example, if a user double taps on the key A|B|C, the prediction engine provides the following two inputs:

$$P(B) = 1 - P(t1)$$

$$P(A,A) = P(t1)$$

Where $t_1$ is the time period between the first and second taps, P(A, A) is the probability the user intended to enter the character 'A' twice and P(B) is the probability the user intended to enter the character 'B'.

When there are further taps (i.e. greater than two), the prediction engine takes into account whether the new tap is intended to be a new character or the change of an existing character for each of the previous alternatives, e.g. for a third tap of the key 'A|B|C':

$$P(C) = (1 - P(t_1)) * (1 - P(t_2))$$

$$P(B,A) = (1 - P(t_1)) * P(t_2)$$

$$P(A,B) = P(t_1) * (1 - P(t_2))$$

$$P(A,A,A) = P(t_1) * P(t_2)$$

Where $t_2$ is the time between the second and third taps.

To reduce the calculations that are required, the prediction engine may be configured prune the number of possible character input options considered. In a preferred embodiment, the prediction engine is configured to take the N most likely candidate characters for each keypress.

Alternatively, the prediction engine may be configured to retain only the characters with an associated probability above a threshold probability value, where the threshold value is set empirically to a pre-defined level or is determined by experiments with the use or is set dynamically using device constraints, such as the constraints of the memory or processor.

For this multi-tap approach that cycles through characters, it is assumed that taps on the same key, correspond to selection of that key, and any difference in locations of the taps is ignored, since the differences are generally negligible. However, if desirable, the probability that the user intended to select that multi-key could be considered (via the 2D Gaussian approach) as well as the probability that the user intended to cycle through characters on that key as described here.

The present invention also provides corresponding methods for determining, using a prediction engine, the probability that a user intended to select or identify a particular input option.

Figure 8:
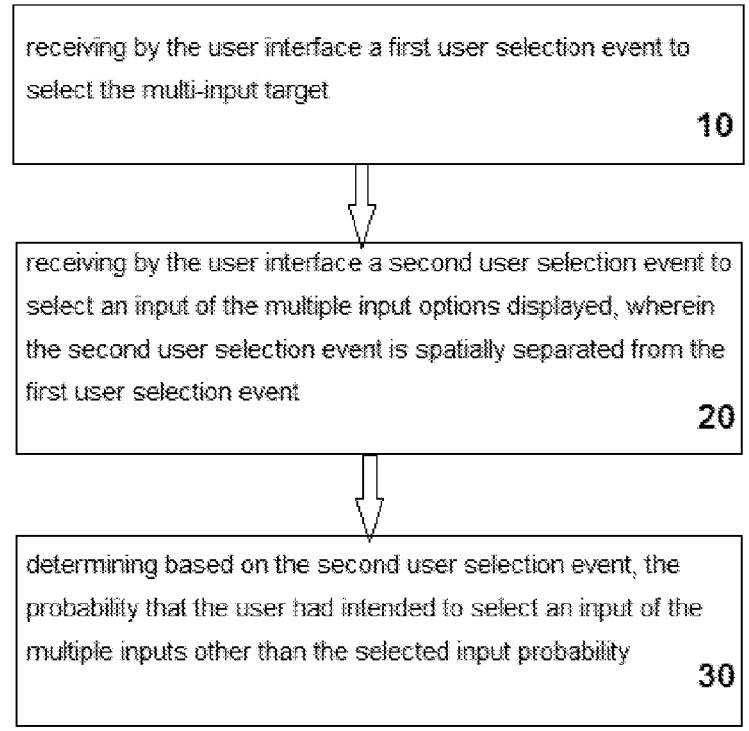
FIG. 8 is a flow chart of a first method of the present invention.

In a first aspect of a method of the present invention, there is provided a method for determining, using a prediction engine, the probability that a user intended to select an input of a user interface that displays multiple input options available via a multi-input key. Referring to FIG. 8, the method comprises receiving (10) by the user interface a first user selection event to select the multi-input target; receiving (20) by the user interface a second user selection event to select an input of the multiple input options displayed, wherein the second user selection event is spatially separated from the first user selection event; and determining (30) based on the second user selection event, the probability that the user had intended to select an input of the multiple inputs other than the selected input probability.

Figure 9:
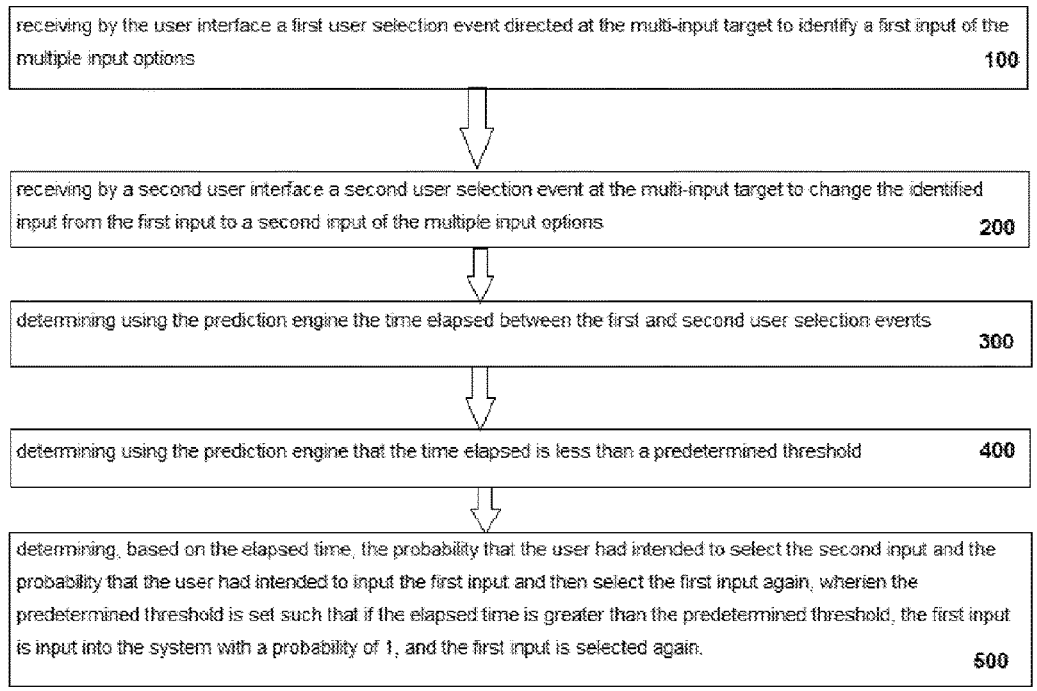
FIG. 9 is a flow chart of a second method of the present invention.

In a second aspect of a method of the present invention, there is provided a method of determining, using a prediction engine, the probability that a user intended to select one of two input options based on a first user selection event and a second user selection event on a user interface, wherein the user interface comprises a multi-input target associated with multiple input options available for input by user selection. Referring to FIG. 9, the method comprises receiving (100) by the user interface a first user selection event directed at the multi-input target to identify a first input of the multiple input options; receiving (200) by a second user interface a second user selection event at the multi-input target to change the identified input from the first input to a second input of the multiple input options; determining (300) using the prediction engine the time elapsed between the first and second user selection events; determining (400) using the prediction engine that the time elapsed is less than a predetermined threshold; and determining (500), based on the elapsed time, the probability that the user had intended to select the second input and the probability that the user had intended to input the first input and then select the first input again. The predetermined threshold is set such that if the elapsed time is greater than the predetermined threshold, the first input is input into the system with a probability of 1, and the first input is selected again.

Other aspects of the methods of the present invention can be readily determined by analogy to the above system description.

The present invention also provides a computer program product comprising a computer readable medium having stored thereon computer program means for causing a processor to carry out one or more of the methods according to the present invention.

The computer program product may be a data carrier having stored thereon computer program means for causing a processor external to the data carrier, i.e. a processor of an electronic device, to carry out the method according to the present invention. The computer program product may also be available for download, for example from a data carrier or from a supplier over the internet or other available network, e.g. downloaded as an app onto a mobile device (such as a mobile phone pr tablet) or downloaded onto a computer, the mobile device, tablet or computer comprising a processor for executing the computer program means once downloaded.

It will be appreciated that this description is by way of example only; alterations and modifications may be made to the described embodiment without departing from the scope of the invention as defined in the claims.

The invention claimed is:

1. A system comprising a processor and memory, the memory storing computer-readable instructions that, when executed by the processor, cause the system to:
    render, in response to receipt of a first user selection event that triggers output of multiple input options, a user interface comprising a multi-input keyboard target associated with the multiple input options available for input by user selection;
    identify an input option of the multiple input options in response to a second user selection event that triggers one of the multiple input options, wherein a location of the second user selection event received in the user interface is spatially separated from a location of the first user selection event received in the user interface;
    perform a selection of a keyboard character, using the identified input option, wherein the selection of the keyboard character corresponds to a first keyboard character of the multiple input options;
    execute a prediction engine configured to determine, based on location and time characteristics from the user inputs in each of the first user selection event and the second user selection event, a probability that the user had intended to select an input option of the multiple input options other than the identified input option, wherein the input option that the user had intended to select corresponds to a second keyboard character;
    change the selection of the keyboard character, from the first keyboard character to the second keyboard character, based on the probability determined by the prediction engine; and
    input the selected keyboard character into the system.

2. The system of claim 1, wherein the first user selection event corresponds to a first tap or a start of a drag-and-lift gesture and the second user selection event corresponds to a second tap or the lift of the drag-and-lift gesture.

3. The system of claim 1, wherein the prediction engine is configured to determine a distance and direction between respective first and second locations of the first and second user selection events.

4. The system of claim 1, wherein the prediction engine comprises a 4D probability distribution model for each input of the multiple input options.

5. The system of claim 4, wherein the prediction engine determines the probability that the user had intended to select an input option of the multiple input options by querying the model associated with that input option with the respective first and second locations of the first and second user selection events or with the first location, and a distance and direction between the first and second locations.

6. The system of claim 4, wherein the model is a 4D Gaussian.

7. The system of claim 1, wherein the first user selection event corresponds to a start of a flick gesture and the second user selection event corresponds to an end of the flick gesture; and wherein the prediction engine is configured to:
    determine a flick direction from the start and end locations; and
    determine the probability that the user intended to select the input option of the multiple input options based on the start location and the direction of the flick.

8. The system of claim 1, wherein the prediction engine generates the probability that a user intended to select a given input option for each of the multiple input options.

9. The system of claim 1, wherein the user interface comprises a pluraiiE of multi-input keyboard targets and the prediction engine is further configured to:
    determine, based on the first user selection event, the probability that the user had intended to select the selected multi-input keyboard target.

10. The system of claim 1, wherein in response to the first user selection event, the user interface is configured to display the multiple input options separated in space.

11. The system of claim 1, wherein the prediction engine comprises a plurality of models, one for each input option of the multiple input options, wherein each model relates previous first and second user selection events corresponding to an input option of the multiple input options to that input option, wherein the prediction engine is configured to generate, in association with the plurality of models, the probability that the first and second user selection events relates to a particular input option of the multiple input options.

12. The system of claim 1, wherein the multi-input keyboard target is a multi-character key on a virtual keyboard that represents multiple character input options.

13. A system comprising a processor and memory, the memory storing computer-readable instructions that, when executed by the processor, cause the system to:
    generate a user interface configured to render a multi-input keyboard target associated with multiple input options available for input by user selection, wherein the multiple input options include a first input option associated with a first keyboard character and a second input option associated with a second keyboard character;
    identify the first input option of the multiple input options in response to receipt of a first user selection event directed at the multi-input keyboard target that triggers the first input option;
    change the identified input option from the first input option to a second input option of the multiple input options in response to receipt of a second user selection event directed at the multi-input keyboard target, based on a location of the first user selection event within the user interface and a location of the second user selection event within the user interface, the locations being inside of an area of the user interface corresponding to the multi-input keyboard target;
    perform a selection of the second keyboard character, using the identified input option;
    execute a prediction engine, wherein the prediction engine is configured to:

determine a time elapsed between the first and second user selection events;

determine that the time elapsed is less than a predetermined threshold; and determine, based on the elapsed time, a probability that the user had intended to select the first input option followed by the second input option relative to the probability that the user had intended to select the first input option consecutively;

change the selection of the second keyboard character, caused from the second user selection event, to a selection of the first keyboard character, based on the probability that the user had intended to select the first input option consecutively being greater than the probability that the user had intended to select the first input option followed by the second input option, wherein the predetermined threshold is set such that if the elapsed time is greater than the predetermined threshold, a probability of 1 is utilized for the probability that the user had intended to select the first input option consecutively; and input the selected keyboard character into the system.

14. The system of claim 13, wherein the multi-input keyboard target is a multi-character key on a virtual keyboard that represents multiple character input options.

15. The system of claim 14, wherein the first user selection event corresponds to a first tap on the multi-character keyboard target which selects the first input and the second user selection event corresponds to a second tap on the multi-character keyboard target which changes the selected input to the second input.

16. The system of claim 13, wherein the probability between the first user selection event and the predetermined threshold is modelled by a sigmoid function.

17. The system of claim 16, wherein the sigmoid function takes the form $$P = \frac{1}{1 + \exp(-(t - t_{p=0.5}))}$$

wherein P is the estimated probability that the user had intended to input the second input, t is the time elapsed between the first and second user selection events, and $t_{p=0.5}$ is the elapsed time at which the probability is equal to 0.5 in the modelled sigmoid probability distribution.

18. A method of determining, using a prediction engine, a probability that a user intended to select an input option of a user interface of a system that displays multiple input options available via a multi-input key, the method comprising:

receiving by the user interface a first user selection event to select the multi-input key;

receiving by the user interface a second user selection event to select an input option of the multiple input options displayed, wherein a location of the second user selection event is spatially separated from a location of the first user selection event and the multiple input options displayed are provided in response to the first user selection event;

performing a selection of a keyboard character, using the selected input option, wherein the selection of the keyboard character corresponds to a first keyboard character of the multiple input options;

determining, based on location and time characteristics from the user inputs in each of the first user selection event and the second user selection event, a probability that the user had intended to select an input option of the multiple input options other than a selected input option, wherein the input option that the user had intended to select corresponds to a second keyboard character;

changing of the selection of the keyboard character, from the first keyboard character to the second keyboard character, based on the probability determined by the prediction engine; and inputting the selected keyboard character into the system.

* * * * *